US008412958B2

(12) United States Patent
Minami et al.

(10) Patent No.: US 8,412,958 B2
(45) Date of Patent: Apr. 2, 2013

(54) TARGET DEVICE, METHOD AND SYSTEM FOR MANAGING DEVICE, AND EXTERNAL DEVICE

(75) Inventors: Kouichi Minami, Ishikawa (JP); Seigo Kotani, Kanagawa (JP)

(73) Assignees: PFU Limited (JP); Fijitsu Limited (JP)

( * ) Notice: Subject to any disclaimer, the term of this patent is extended or adjusted under 35 U.S.C. 154(b) by 850 days.

(21) Appl. No.: 11/624,082

(22) Filed: Jan. 17, 2007

(65) Prior Publication Data

US 2007/0165264 A1    Jul. 19, 2007

(30) Foreign Application Priority Data

Jan. 18, 2006  (JP) ................................. 2006-010354
Jun. 7, 2006   (JP) ................................. 2006-158718

(51) Int. Cl.
    *G06F 15/177* (2006.01)
(52) U.S. Cl. .................... 713/194; 713/1; 713/2; 726/2; 726/34
(58) Field of Classification Search .................. 713/194, 713/2, 1; 726/34, 2
    See application file for complete search history.

(56) References Cited

U.S. PATENT DOCUMENTS

| | | | | |
|---|---|---|---|---|
| 5,966,446 | A * | 10/1999 | Davis ............................. | 713/178 |
| 7,058,807 | B2 | 6/2006 | Grawrock et al. | |
| 7,382,880 | B2 * | 6/2008 | Angelo et al. ................. | 380/259 |
| 7,490,070 | B2 * | 2/2009 | Brickell .......................... | 705/75 |
| 2003/0097571 | A1 | 5/2003 | Hamilton et al. | |
| 2004/0143730 | A1 | 7/2004 | Wen et al. | |
| 2005/0060561 | A1 * | 3/2005 | Pearson et al. ................. | 713/194 |
| 2005/0163317 | A1 * | 7/2005 | Angelo et al. ................. | 380/259 |
| 2005/0166024 | A1 * | 7/2005 | Angelo et al. ................. | 711/164 |
| 2006/0005009 | A1 * | 1/2006 | Ball et al. ....................... | 713/155 |
| 2006/0010079 | A1 * | 1/2006 | Brickell .......................... | 705/67 |
| 2006/0026422 | A1 * | 2/2006 | Bade et al. ..................... | 713/164 |
| 2006/0107054 | A1 * | 5/2006 | Young ............................ | 713/176 |

FOREIGN PATENT DOCUMENTS

| | | |
|---|---|---|
| DE | 000004406602 A1 | 9/1995 |
| DE | 000019600771 A1 | 4/1997 |
| JP | 07-210729 | 8/1995 |
| JP | 2000-267857 | 9/2000 |
| JP | 2004282391 | 10/2004 |
| JP | 2004359036 | 12/2004 |
| JP | 2005527900 | 9/2005 |
| JP | 2005-317026 | 11/2005 |
| WO | 03090053 | 10/2003 |
| WO | 2005106620 | 11/2005 |

OTHER PUBLICATIONS

Pearson et al. "Trusted Computing Platforms: TCPA Technology in Context" © 2002 Prentice Hall Inc. (347 pages).*

(Continued)

*Primary Examiner* — Kambiz Zand
*Assistant Examiner* — Thomas Gyorfi
(74) *Attorney, Agent, or Firm* — Lowe Hauptman Ham & Berner, LLP

(57) ABSTRACT

A device management system is configured with a target device including at least one unit that includes a tamper-resistant chip, a management apparatus that manages or uses the target device, and an authentication apparatus including a database for authentication, connected via a network in a communicable manner. In the target device, each unit is equipped with the tamper-resistant chip that collects device information specific to a unit, stores collected device information, and stores a confidential-key.

3 Claims, 8 Drawing Sheets

OTHER PUBLICATIONS

"Trusted Computing Group TPM v1.2 Specification Changes", Oct. 2003. © 2003 Trusted Computing Group (14 pages) http://hackipedia.org/Digital%20Rights%20Management/Trusted%20Computing/hardware/pdf/TPM_1_2_Changes_final.pdf.*

"Trusted Platform Module Specification v1.2 Enhances Security" Jun. 2004. © 2004 Trusted Computing Group (6 pages) http://files.ieiworld.com/files/RefFile/20060508_Enano-8523T/TPM_collateral_English_by_Trusted_Computing_Group.pdf.*

German Patent Office, Office Action mailed Jun. 22, 2007 and English Translation.

Office Action dated Sep. 15, 2008.

Japanese Office Action for Application No. 2006-158718 mailed Oct. 4, 2011.

* cited by examiner

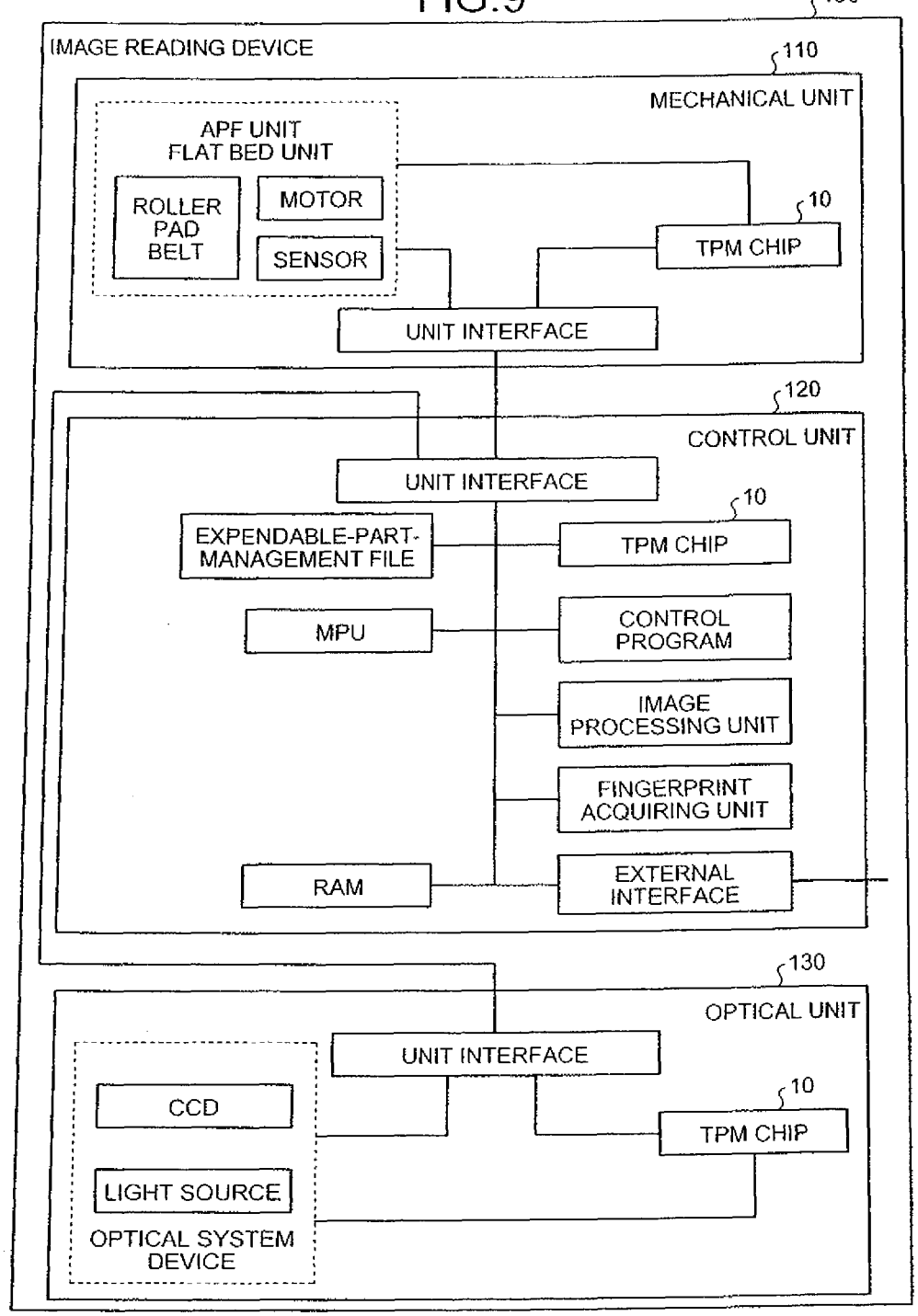

US 8,412,958 B2

TARGET DEVICE, METHOD AND SYSTEM FOR MANAGING DEVICE, AND EXTERNAL DEVICE

RELATED APPLICATIONS

The present application is based on, and claims priority from, Japan Application Number 2006-010354, filed Jan. 18, 2006 and Japan Application Number 2006-158718, filed Jun. 7, 2006, the disclosures of which are hereby incorporated by reference herein in their entirety.

BACKGROUND OF THE INVENTION

1. Field of the Invention

The present invention relates to a target device such as an image reading device, a device management system, a device management method, and an external device.

2. Description of the Related Art

Conventionally, a remote maintenance system collectively conducting remote monitoring of target devices such as a plurality of types of terminal devices exists (see, e.g., Japanese Patent Application Laid-open No. 1995-210729). A remote maintenance system that can remotely write latest programs to target devices also exists (see, e.g., Japanese Patent Application Laid-open No. 2000-267857).

In respect to the security enhancement that each enterprise individually pursued, enterprises with technology providing a PC platform assembled to form TCG (Trusted Computing Group), addressing to create new hardware/software having higher reliability and safety as an industry group. In the TCG, specifications of a TPM (Trusted Platform Module) chip pertaining to a security chip are stipulated for the computing platform (see Japanese Patent Application Laid-open No. 2005-317026).

However, conventional remote maintenance systems shown in Japanese Patent Application Laid-open Nos. 1995-210729 and 2000-267857 had problems that identity and validity of units composing the target devices cannot be ensured.

In other words, the conventional arts had problems that validity and identity cannot be confirmed if a part of the units composing the target device is illicitly tampered or replaced when remotely using or managing (maintaining, etc) the target devices.

SUMMARY OF THE INVENTION

It is an object of the present invention to at least partially solve the problems in the conventional technology.

A target device according to one aspect of the present invention includes at least one unit that includes a tamper-resistant chip. The tamper-resistant chip includes a device-information storing unit that stores device information specific to the unit; and a confidential-key storing unit that stores a confidential key.

A device management system according to another aspect of the present invention is configured with a target device including at least one unit that includes a tamper-resistant chip, a management apparatus that manages or uses the target device, and an authentication apparatus, connected via a network in a communicable manner. The management apparatus includes a requesting unit that transmits a unit-information confirmation request to the target device. The target device includes a request receiving unit that receives transmitted unit-information confirmation request; and a transmitting unit that encrypts device information including unit information that includes a unit identification number stored in the tamper-resistant chip with a confidential key stored in the tamper-resistant chip, and transmits encrypted device information to the authentication apparatus, for each unit. The authentication apparatus includes a device-information receiving unit that receives the device information; and an evaluation unit that decrypts received device information, evaluates whether decrypted device information corresponds to device information that is stored in a database of the authentication apparatus in advance, and transmits a result of evaluation to the target device and the management apparatus.

A device management system according to still another aspect of the present invention is configured with a target device including at least one unit that includes a tamper-resistant chip, a management apparatus that manages or uses the target device, and an authentication apparatus, connected via a network in a communicable manner. The management apparatus includes a requesting unit that transmits a unit-program confirmation request to the target device. The target device includes a request receiving unit that receives transmitted unit-program confirmation request; and a first transmitting unit that encrypts device information including unit information that includes a unit identification number stored in the tamper-resistant chip and program-version information relating to a version of a program that is executed by the unit with a confidential key stored in the tamper-resistant chip, and transmits encrypted device information to the authentication apparatus, for each unit. The authentication apparatus includes a device-information receiving unit that receives the device information; and a second transmitting unit that decrypts received device information, evaluates whether a correspondence relationship between the unit identification number and the program-version information included in the device information matches with a correspondence relationship between unit identification number and program-version information stored in a database of the authentication apparatus in advance, when the relationships do not match, acquires a program file corresponding to a correct program version from the database, and transmits acquired program file to the target device.

A device management system according to still another aspect of the present invention is configured with a target device configured with at least one unit that includes a tamper-resistant chip including a device-information storing unit that stores device information specific to a unit and a confidential-key storing unit that stores a confidential key, and an external device that manages or uses the target device, connected via a network in a communicable manner. The target device includes an encrypting unit that encrypts stored device information using the confidential key; and a first transmitting unit that transmits encrypted device information to the external device connected to the target device. The external device includes a device-information receiving unit that receives transmitted device information; an evaluating unit that decrypts received device information, and evaluates whether the device information corresponds to device information that is stored in a database in advance; and a second transmitting unit that transmits a result of evaluation by the evaluating unit to the target device.

A device management method according to still another aspect of the present invention is for a device management system in which a target device configured with at least one unit that includes a tamper-resistant chip including a device-information storing unit that stores device information specific to a unit and a confidential-key storing unit that stores a confidential key, and an external device that manages or uses the target device are connected via a network in a communicable manner. The device management method includes encrypting including the target device encrypting the device information using the confidential key; transmitting including the target device transmitting encrypted device information to the external device connected to the target device; receiving including the external device receiving transmitted device information; evaluating including the external device decrypting received device information, the external device evaluating whether the device information corresponds to device information that is stored in a database in advance, and the external device transmitting a result of evaluation the target device.

An external device according to still another aspect of the present invention manages or uses a target device that is configured with at least one unit that includes a tamper-resistant chip including a device-information storing unit that stores device information specific to a unit and a confidential-key storing unit that stores a confidential key. The external device is connected to the target device via a network in a communicable manner. The external device includes a device-information receiving unit that receives, upon the target device encrypting stored device information using the confidential key and transmitting encrypted device information, transmitted device information; an evaluating unit that decrypts received device information, and evaluates whether the device information corresponds to device information that is stored in a database in advance; and a transmitting unit that transmits a result of evaluation by the evaluating unit to the target device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a block diagram for explaining an example of a management process of an expendable part of the system according to the present embodiment.

DETAILED DESCRIPTION OF THE PREFERRED EMBODIMENTS

Exemplary embodiments of the present invention will be described below in detail with reference to the accompanying drawings. However, the present invention is not limited to the present embodiments. Specifically, although an image reading device as a target device and a TPM chip as a chip having tamper resistance are cited as examples in the present embodiments, the present invention is not limited to the present embodiments.

Figure 1:
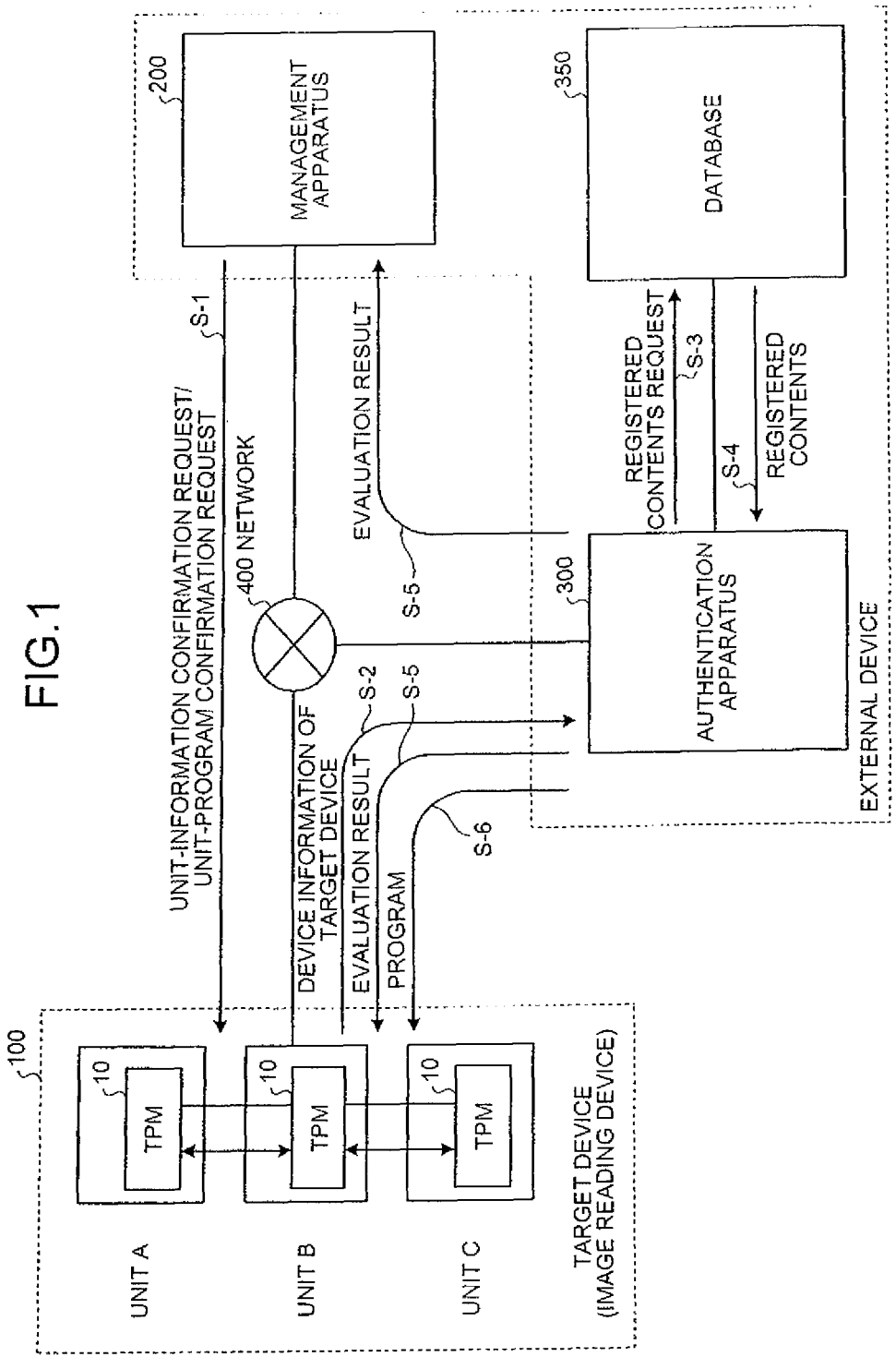
FIG. 1 is a schematic diagram for explaining a fundamental principle of the present invention.

FIG. 1 is a schematic diagram for explaining a fundamental principle of the present invention.

Briefly, the present invention has following fundamental features. The system is roughly configured by communicably connecting through a network 400, a target device (for example, image reading device 100) having one or more than two units at least including a chip having tamper resistance (for example, TPM chip 10), a management apparatus 200 that manages or uses the target device 100, and an authentication apparatus having a DB 350 for authentication. The management apparatus 200 and the authentication apparatus 300 conceptually function as external devices connected to the target device through the network 400.

In the system configured this way, a chip (TPM chip 10) is installed in each unit, the chip that gathers, stores, and signs device information of each unit having tamper resistance at the target device 100 configured with one or a plurality of units (units A to C of FIG. 1). TPM chip 10 is fixed in a housing of each unit so that the chip cannot be easily removed from outside, and the units can be configured so that the units cannot operate when the TPM chips 10 are removed.

The "device information" at least includes one of unit information at least including a unit identification number, expendable-part information relating to an expendable part, program-version information relating to a version of the program, measurement-value information relating to environment of the unit at least including a temperature, a humidity, and an altitude, setting information of the unit during operation, and operation-result information relating to an operation result of the unit.

In FIG. 1, the TPM chip 10 includes a device-information storing unit that stores device information specific to the unit and a confidential-key storing unit that stores a confidential key.

In FIG. 1, each unit includes an other-unit device-information storing unit that stores device information of another device, an encrypting unit that encrypts the device information stored in the device-information storing unit using the confidential key stored in the confidential-key storing unit, an inter-unit transmitting unit that transmits the device information encrypted by the encrypting unit to another unit, a decrypting unit that decrypts the device information transmitted by the inter-unit transmitting unit using the confidential key stored in the confidential-key storing unit, an inter-unit inspecting unit that inspects whether the device information decrypted by the decrypting unit corresponds to the device information stored in the other-unit device-information storing unit, and an external device transmitting unit that transmits the device information encrypted by the encrypting unit to the external device connected to the target device.

In FIG. 1, the external device (the management apparatus or the authentication apparatus) includes a device-information receiving unit that receives the device information transmitted from the external device transmitting unit, an evaluating unit that decrypts the device information received by the device-information receiving unit to evaluate whether the device information corresponds to device information preliminarily stored in the database, and an evaluation result transmitting unit that transmits the evaluation result of the evaluating unit to the target device.

As shown in FIG. 1, in response to a unit-information confirmation request from the management apparatus 200 that uses or manages the target device 100 (step S-1), the system configured as described above encrypts the device information using the confidential key stored in the TPM chip 10, and then transmits the device information to the authentication apparatus 300 (step S-2).

After decrypting the device information with reference to registered contents of the DB 350, the authentication apparatus 300 determines which device is a destination of information transmitted from the target device and evaluates validity of the contents of each unit information, etc., (step S-3 and step S-4). The authentication apparatus 300 then transmits the evaluation result to the target device 100 or the management apparatus 200 (step S-5).

The external device (management apparatus 200 or authentication apparatus 300) includes an operation-information storing unit that stores operation information corresponding to each information included in the device information, a device-information receiving unit that receives the transmitted device information, an operation extracting unit that decrypts the device information received by the device-information receiving unit to extract operation information stored in the operation-information storing unit corresponding to the device information, and a operation information transmitting unit that transmits the operation information extracted by the operation extracting unit to the target device or other external devices.

One example of the contents of the operation information will now be shown below.
1) The target device 100 and the management apparatus 200 separate the target device 100 from the network when determined by the evaluation result to be unusable.
2) The target device 100 displays an alarm itself.
3) The target device 100 cuts off power supply itself.
4) The management apparatus 200 halts starting up the system.
5) The management apparatus 200 transmits to other external devices in the system that the target device 100 is unusable.
6) Transmit a message to the target device 100 or other external devices, the message that notifies a service unit of information of a unit that should be replaced.
7) Transmit a message to the target device 100 or other external devices, the message that notifies a supplier of information of an expendable part that should be replaced.
8) The target device 100 and the management apparatus 200 update a program.

A case of the target device 100 and the management apparatus 200 updating a program shown in 8) above will be described as one example of the operation information.

As shown in FIG. 1, in the target device 100, in response to a unit-program confirmation request (step S-1), the system encrypts unit information at least including a unit identification number stored in a chip and device information including program-version information relating to a version of a program executed by a unit, using the confidential key stored in the TPM chip 10, and the system transmits the encrypted information to the authentication apparatus 300 (step S-2).

After decrypting the device information with reference to the registered contents of the DB 350, the authentication apparatus 300 determines from which target device 100 the device information is transmitted and evaluates whether the correspondence relationship between the unit identification number included in the device information and the program-version information corresponds to the correspondence relationship between the unit identification number preliminarily stored in the DB 350 of the authentication apparatus 300 and the program-version information (step S-3 and step S-4). When the relationships do not correspond, the authentication apparatus 300 acquires a program corresponding to the correct program version from the DB 350, and the authentication apparatus 300 then extracts operation information from the operation-information storing unit (for example, DB 350) to transmit to the target device 100 and transmits the operation information (step S-6).

By installing an individual authentication device in the target device 100 or a management apparatus 200, the system may be configured such that only predetermined individuals can execute processing.

Figure 2:
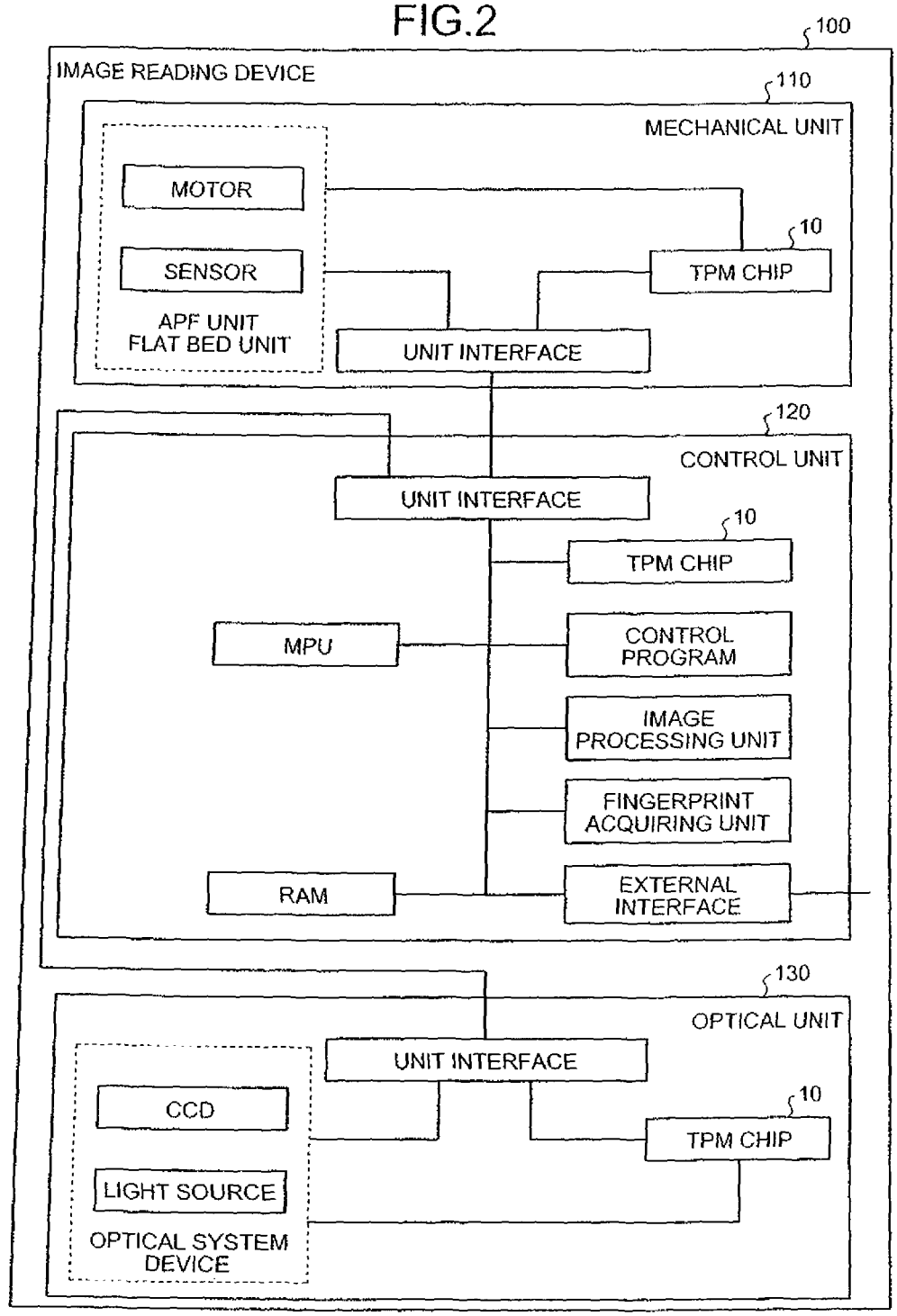
FIG. 2 is a block diagram of an example of an image reading device to which the present invention is applied.

FIG. 2 is a block diagram of an example of the image reading device 100 to which the present invention is applied, in which only parts of the configuration related to the present invention are conceptually illustrated.

As shown in FIG. 2, the image reading device 100 is configured to at least roughly provide a mechanical unit 110, an optical unit 130, and a control unit. For each unit, a TPM chip 10 that is a chip having tamper resistance and that gathers information related to the units and stores the information is installed. Device information, a confidential key required for signature and encryption, etc., are stored in the TPM chip 10, and individual authentication functions such as a fingerprint may also be installed. The TPM chip 10 is fixed in the housing of each unit in a manner that the chip cannot be easily removed from outside, and the unit is configured so that the unit cannot operate when the chip is removed.

In the mechanical unit 110, an automatic paper feeding (APF) unit/flat bed unit including a motor, a sensor, etc., and a TPM chip 10 are interconnected through a unit interface.

In the control unit 120, an MPU, a memory device storing a control program, an image processing unit, a fingerprint acquiring unit, an external interface, a RAM, and TPM chip 10 are interconnected through the unit interface.

In the optical unit 130, a CCD, an optical system device including a light source, etc., and a TPM chip 10 are interconnected through the unit interface.

The environment of the unit (temperature, humidity, altitude, etc.) may be measured at each unit (110, 120, and 130) and various sensors may also be provided.

Figure 3:
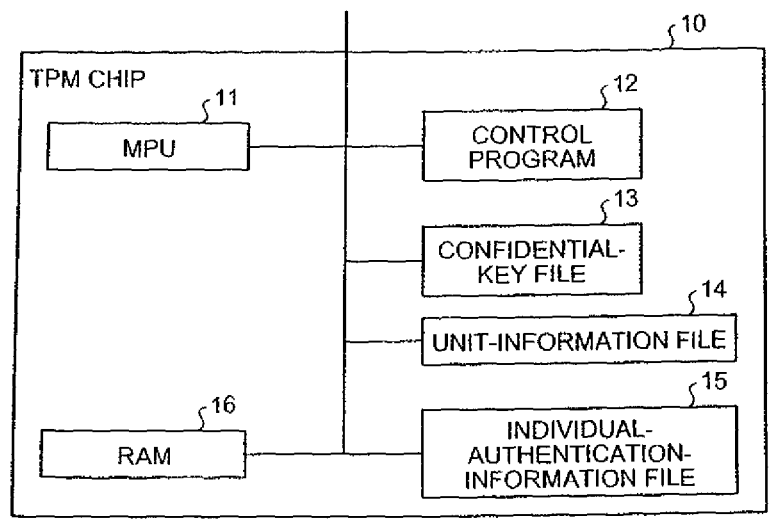
FIG. 3 is a block diagram of an example of a TPM chip to which the present invention is applied.

FIG. 3 is a block diagram of an example of the TPM chip 10 to which the present invention is applied, in which only parts of the configuration related to the present invention are conceptually illustrated.

As shown in FIG. 3, the TPM chip 10 is configured to at least include an MPU 11, a control program 12 that controls a unit, a confidential-key file 13 that encrypts device information, a unit-information file 14 that stores unit information at least including a unit identification number, an individual-authentication-information file 15 that stores fingerprint information for individual authentication, etc., program-version information relating to a version executed by a unit, expendable-part information relating to an expendable part, a measurement value relating to the environment of a unit (temperature, humidity, altitude, etc), setting information of a unit during operation, and a RAM 16 that stores log information, etc., including the operation result.

Figure 4:
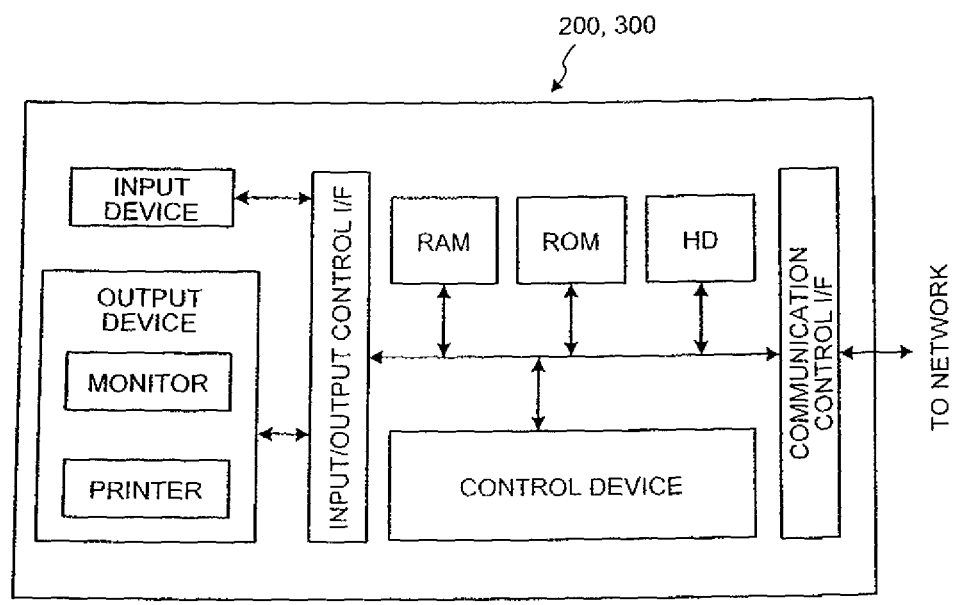
FIG. 4 is a block diagram of an example of a management apparatus and an authentication apparatus to which the present invention is applied.

FIG. 4 is a block diagram of an example of the management apparatus 200 and the authentication apparatus 300 to which the present invention is applied, in which only parts of the configurations related to the present invention are conceptually illustrated.

The management apparatus 200 and the authentication apparatus 300 may be configured with a commercially available information processing device such as a workstation and a personal computer or with an attached device thereof. Functions of the management apparatus 200 and the authentication apparatus 300 are realized by a control device such as a CPU configuring a hardware, a hard disk drive, a storage device such as a memory device (RAM, ROM, etc), an input device, an output device, an input/output controlling interface, a communication controlling interface, programs controlling the devices, etc.

Figure 5:
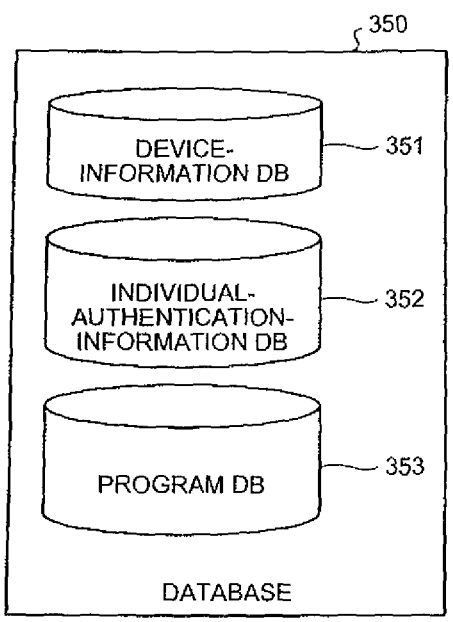
FIG. 5 is a block diagram of an example of a database stored in a storage device of the authentication apparatus.

FIG. 5 is a block diagram of an example of the DB 350 stored in the authentication apparatus 300, in which only parts of the configuration related to the present invention are conceptually illustrated. As shown in FIG. 5, the DB 350 is configured to at least provide a device-information DB 351, an individual-authentication-information DB 352, and a program DB 353.

For each target device, the device-information DB 351 stores by associating unit information including the unit identification number that constitutes the target device, information relating to the measurement values regarding the environment of the unit at least including a temperature, a humidity, and an altitude, log information including the device information and the operation results during unit operation, etc.

The "unit information" may include, in addition to the unit identification number, a product name, a name of the manufacturer, a version, etc.

For each target device, the individual-authentication-information DB 352 stores by mutually associating the authentication information relating to an individual allowed to operate the object device (for example, a password and fingerprint information).

For each target device, the program DB 353 stores by mutually associating a unit identification number, program-version information relating to a version of the program executed by the unit, and a program file corresponding to the version. Although the program DB 353 is described as an example of the operation information database, other than this, an expendable part database that stores by mutually associating an expandable part, a durable number of uses and period, etc., may be used.

One example of the process of the system according to the present embodiment configured this way will then be described in detail with reference to FIG. 6, FIG. 7, etc.

Figure 6:
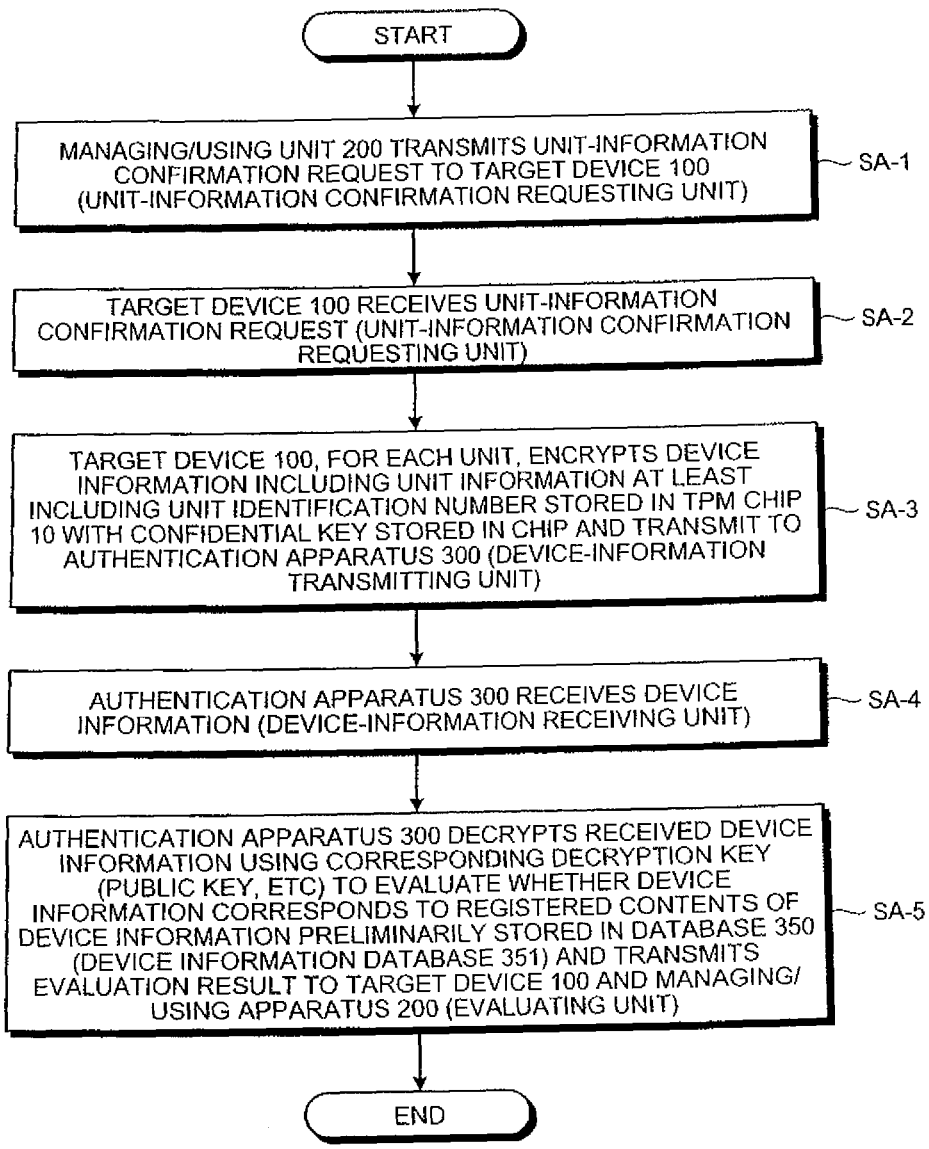
FIG. 6 is a flowchart of a processing procedure for a unit-information confirmation process of a system according to an embodiment of the present invention.

FIG. 6 is a flowchart of a processing procedure for the unit-information confirmation process according to the present embodiment.

In FIG. 6, the management apparatus 200 transmits a unit-information confirmation request to the target device 100 (unit-information confirmation requesting unit: step SA-1). The request may be conducted from the target device 100.

The target device 100 then receives the unit-information confirmation request (unit-information confirmation requesting unit: SA-2).

For each unit, the target device 100 encrypts the device information including the unit information that at least includes the unit identification number stored in the TPM chip 10 with the confidential key stored in the chip, and the target device 100 transmits the information to the authentication apparatus 300 (device information transmitting unit: SA-3).

In other words, the target device 100 receives the request, and for example, the TPM chip 10 of the control unit 120 gathers unit information (unit identification number, etc.) of the TPM chip 10 of the units (110, 120, and 130), and encrypts the information with the confidential key and transmits the information to the authentication apparatus 300.

The authentication apparatus 300 then receives the device information (device-information receiving unit: step SA-4).

The authentication apparatus 300 decrypts the received device information with a corresponding key (a public key, etc) and evaluates whether the device information corresponds to the registered contents of the device information preliminarily stored in the DB 350 (the device-information DB 351), and the authentication apparatus 300 transmits the evaluation result to the target device 100 and the management apparatus 200 (evaluating unit: step SA-5).

By decrypting the transmitted device information with the public key, the authentication apparatus 300 identifies the target device 100 that transmitted the data, and the authentication apparatus 300 obtains the unit information (unit identification number, etc.) of the target device 100 preliminarily registered in the DB 350 and compares the unit information with the transmitted unit information. The authentication apparatus 300 then makes a report of evaluation results of whether the device information correspond or which part is different, etc., and transmits the report to the device that sent out the request.

The evaluation results may be encrypted with the public key. By encrypting with the public key, the apparatus that received the report of the evaluation results can confirm that the evaluation results are transmitted from a safe authentication apparatus.

The device information may include measurement values relating to the environment of the device such as a temperature, a humidity, and an altitude, or may include operation values of each unit (a light quantity, an image processing value, an operation value of a mechanism, a sensor level, etc.), or the device information may include log information such as an operation result of the unit (error information).

A unit-program confirmation process conducted in the system will then be described with reference to FIGS. 2 to 5 and FIG. 7, etc. FIG. 7 is a flowchart of a processing procedure for the unit-program confirmation process of the system according to the present embodiment.

Figure 7:
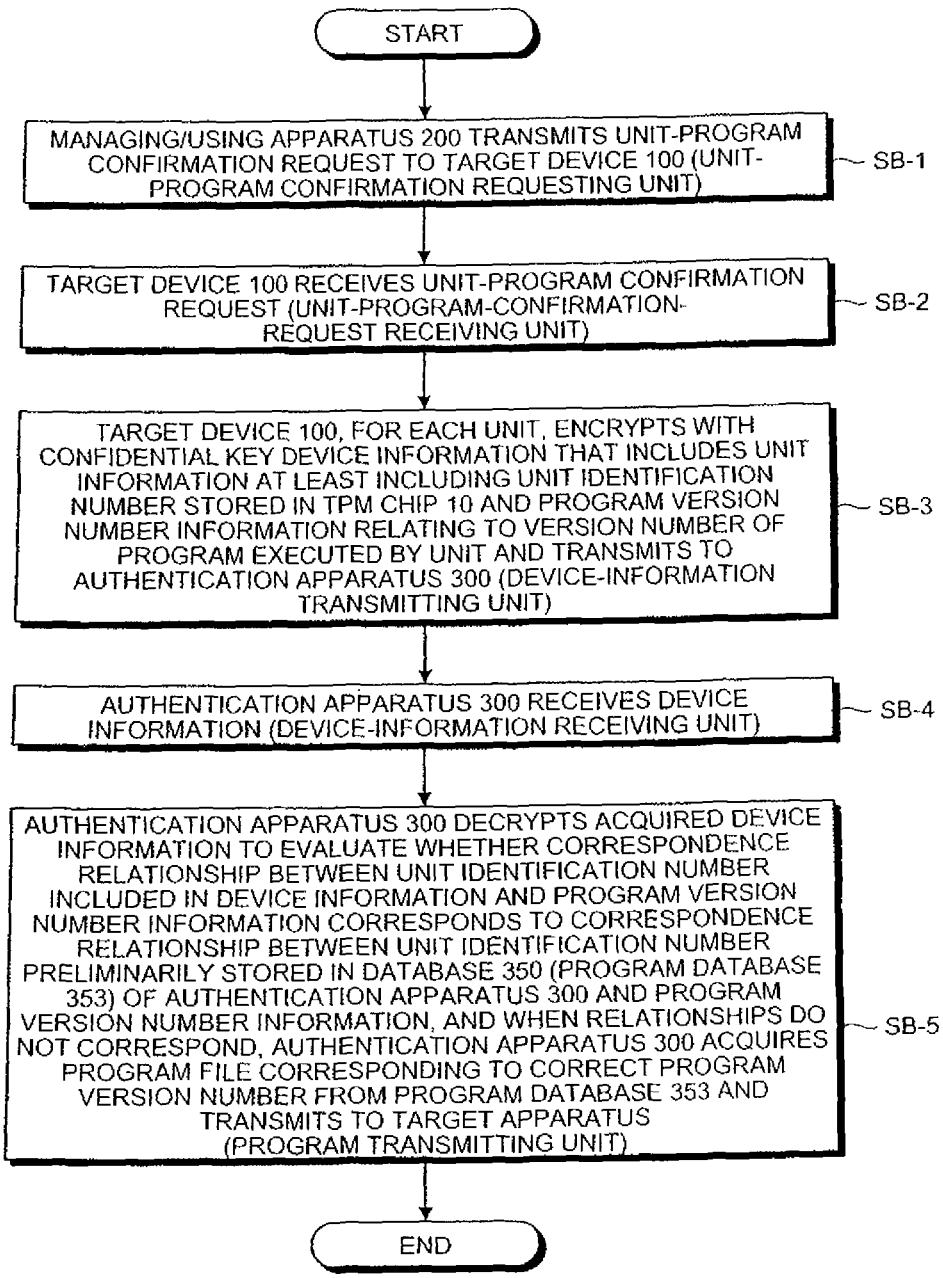
FIG. 7 is a flowchart of a processing procedure for a unit-program confirmation process of the system according to the present embodiment.

In FIG. 7, the management apparatus 200 transmits a unit-program confirmation request to the target device 100 (unit-program confirmation request unit: step SB-1). The request may be conducted from the target device 100.

The target device 100 then receives the unit-program confirmation request (unit-program confirmation request receiving unit: step SB-2).

For each unit, the target device 100 encrypts, with the confidential key stored in the TPM chip 10, the unit information at least including the unit identification number stored in the TPM chip 10 and the device information including the program-version information relating to the version of the program executed by the unit, and the target device 100 then transmits the information to the authentication apparatus 300 (device information transmitting unit: step SB-3).

In other words, after the target device 100 receiving a request, for example, the TPM chip 10 of the control unit 120 gathers device information including the unit information (unit identification number, etc.) of the units (110, 120, and 130), program-version information, etc., and the TPM chip 10 encrypts the information with the confidential key and transmits the information to the authentication apparatus 300.

The authentication apparatus 300 then receives the device information (device-information receiving unit: step SB-4).

The authentication apparatus 300 decrypts the received device information and evaluates whether the correspondence relationship of the unit identification number included in the device information and the program-version information corresponds to the correspondence relationship of the unit identification number preliminarily stored in the DB 350 (program DB 353) of the authentication apparatus 300 and the program-version information, and when the correspondence relationships do not correspond, the authentication apparatus 300 acquires a program file corresponding to the correct program version from the program DB 353 and transmits the program file to the target device (program transmitting unit: step SB-5).

In other words, the authentication apparatus 300 acquires the unit information (unit identification number) of the target device 100 preliminarily registered in the program DB 353 and the corresponding program-version information and then compares the information with the transmitted device information. When the unit information (unit identification number) and the program version are different, the authentication apparatus 300 transmits the program file of the correct version.

The program file may be encrypted with the public key and transmitted to the target device 100. Receiving the program, the target device 100 decrypts the program with the public key, and the target device 100 can confirm that the program is transmitted from the safe authentication apparatus 300.

In addition to a program used in the target device, the program includes a program necessary to use the target device (for example, a driver software), etc.

Figure 8:
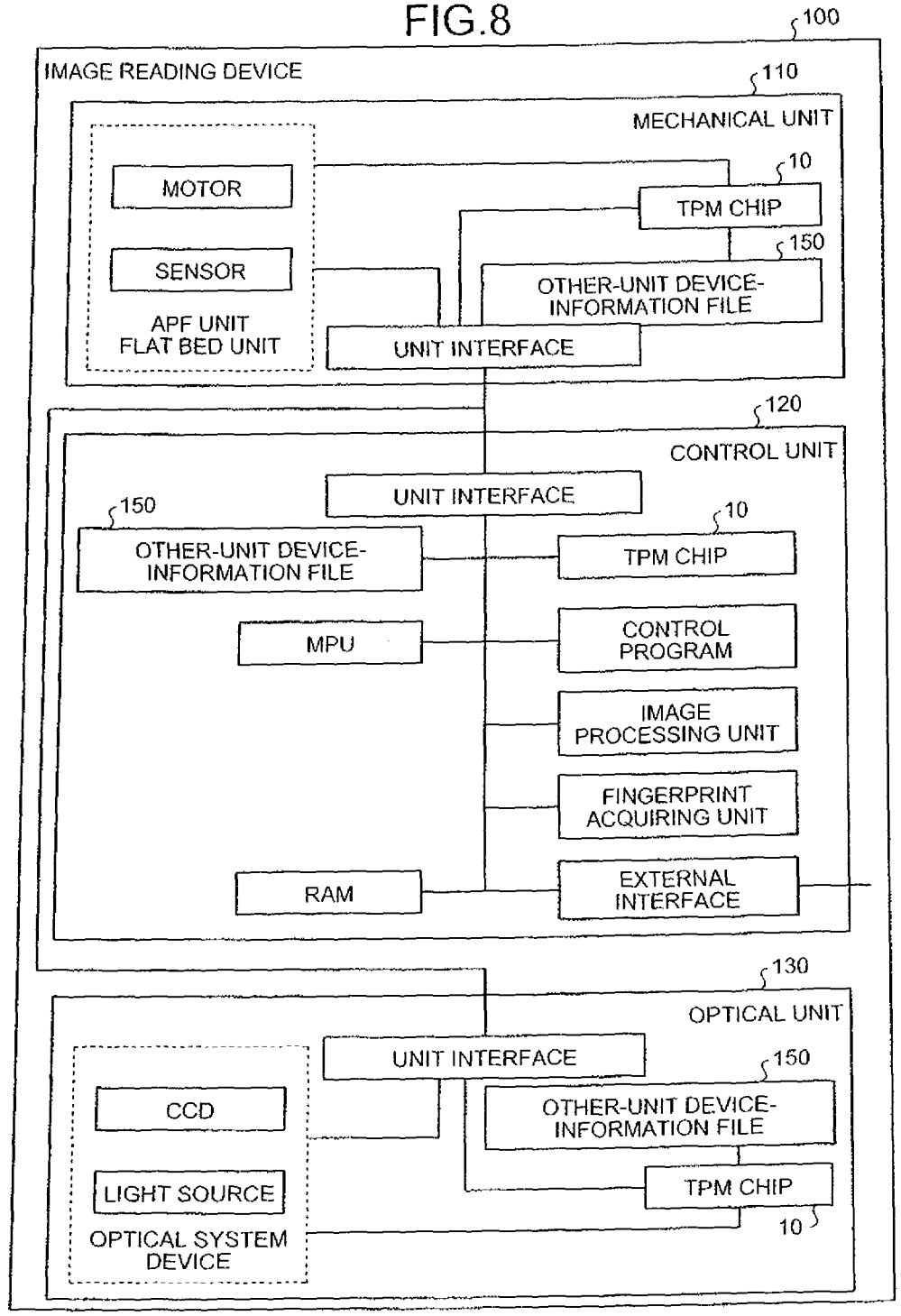
FIG. 8 is a block diagram for explaining an example of an inter-unit authentication process of the system according to the present embodiment.

FIG. 8 is a block diagram for explaining an example of the inter-unit authentication process of the system according to the present embodiment.

As shown in FIG. 8, the image reading device 100 such as an image scanner consists of the mechanical unit 110, the control unit 120, and the optical unit 130.

In the TPM chip 10 of each unit, specific information such as a version of the unit and a program version is stored. In each unit, information of other units usable by the unit (other-unit device-information file 150) is also stored.

When necessary, each unit encrypts (signs) the device information using the confidential key stored in the TPM chip 10 having tamper resistance and transmits the information to another unit. The device information may be converted to a hash value and transmitted.

The unit that received the information then decrypts the device information and determines whether the information is transmitted from an authorized unit and from which unit the information is transmitted. The unit that received the information further determines, from the contents of the device information, whether the unit is usable.

The compliance determination is conducted, for example, when a version B and a version C of the mechanical unit 110 are usable for a version A of the control unit 120 and the version A is unusable.

Confirming all units are usable, the image reading device 100 switches to an operable state. When the units are unusable, the image reading device 100 displays an alarm, and transmits an error signal through the control unit 120.

FIG. 9 is a block diagram for explaining an example of the management process of an expendable part of the system according to the present embodiment.

As shown in FIG. 9, the image reading device 100 such as an image scanner consists of the mechanical unit 110, the control unit 120, and the optical unit 130. The image reading device 100 includes expendable parts such as a roller, a pad, and a lamp. An expendable part is a part that the characteristics deteriorate after certain time and certain operations and that requires to be replaced by a new part, such as a toner cartridge or a photosensitive drum in a printer.

The replacing timing of the roller and the pad can be recognized from the number of operations of a motor and the replacing timing of the lamp can be recognized from the lighting time. This information is stored in an expendable-part-managing file of the control unit 120.

The TPM chip 10 of the control unit 120 gathers information of the expendable parts and creates device information, and the TPM chip 10 then attaches a signature (encrypts with a confidential key) to the information and transmits the information to the authentication apparatus.

By decrypting the transmitted device information with the public key, the authentication apparatus 300 can specify the image reading device 100 that transmitted the device information.

The authentication apparatus 300 then acquires preliminarily registered device information (expendable-part information) of the image reading device 100 from the DB 350 and compares (evaluates) the information with the transmitted expendable-part information. The authentication apparatus 300 notifies the evaluation result to the scanner device or the management apparatus.

For example, in a case of the lamp, if 2000 hours is a reference value, the authentication apparatus 300 notifies an evaluation result of a caution level when the lighting time exceeds 1800 hours and notifies an evaluation result of a warning level when the lighting time exceeds 2000 hours.

Although an embodiment of the present invention has been described, other than the present embodiment described above, the present invention may be implemented in various other embodiments within the technical scope of the claims described above.

For example, the present invention may be configured by installing an individual authentication device in the target device or in the management apparatus 200 for the processes described above so that only individuals (for example, a system administrator and a maintenance person) specified by the device can conduct the processes.

Of the processes described in the present embodiment, all or parts of the processes that are described to be conducted automatically can be conducted manually and all or parts of the processes that are described to be conducted manually can be conducted automatically with known methods.

The information including the parameters of processing procedures, control procedures, specific names, various registration data, search conditions, etc., the image examples, and the database configurations described in the document and drawings above can be arbitrarily changed unless otherwise stated.

The components of the drawings are functional and conceptual and do not necessarily have to be physically configured as illustrated.

For example, all or arbitrary parts of the processing functions provided by the units of the controlling device or by the devices can be realized by the CPU (Central Processing Unit) or by the programs interpreted and executed by the CPU, or the processing functions can be realized as a hardware with wired logic. The programs are stored in a recording medium described below, and the controlling device mechanically reads the programs as necessary.

In a storage device such as a ROM or an HD, a computer program is stored that collaborates with an OS (Operating System) and gives a command to the CPU to conduct various processes. The computer program is executed by being loaded to a RAM, etc., and the computer program collaborates with the CPU and configures the controlling apparatus. The computer program may be recorded in an application program server connected through an arbitrary network, and all or a part of the computer program can be downloaded as necessary.

The programs of the present invention can be stored in computer readable recording media. The "recording media" include arbitrary "portable physical media" such as a flexible disk, a magneto-optical disk, a ROM, an EPROM, an EEPROM, a CD-ROM, an MO, a DVD, arbitrary "fixed physical media" such as a ROM, a RAM, an HD that are mounted on various computer systems, and "communication media" that hold the programs for a short period such as a communication line and a carrier wave when transmitting the programs through the network represented by a LAN, a WAN, and Internet.

The "program" is a data processing method described with an arbitrary language or a description method, and the program can be any format such as in source code or in binary code. The "program" is not necessarily limited to a single configuration, but includes the programs having dispersed configurations with a plurality of modules or libraries and the programs achieving functions by collaborating with other programs represented by an OS (Operating System). Known configurations and procedures can be used for, such as, specific configurations for reading the recording media at each unit according to the present embodiment, reading procedures, and installing procedures after reading.

Specific configurations of distribution and integration of the devices are not limited to the configurations in the drawings, and all or some of the configurations can be configured by functionally or physically distributing and integrating in arbitrary units in compliance with various loads, etc. For example, each database may be independently configured as an independent database device, and a part of the processes may be realized by using the CGI (Common Gateway Interface).

The target device, the device management system, the device management method, and the external device of the present invention accomplish successful outcomes of accurately figuring out current states of the apparatuses and of safely and surely determining whether the apparatuses are properly used and whether the apparatuses are set up in proper states.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading device, comprising:
a plurality of functional units including at least a mechanical unit, a control unit, and an optical unit, each of the functional units further comprising:
    a tamper-resistant chip including:
        a first device-information storing part that stores device information of the functional unit; and
        a confidential-key storing part that stores a confidential key;
    a second device-information storing part that stores device information of other functional units within the image reading device;
    an encrypting part configured to encrypt the device information stored in the first device-information storing part using the confidential key stored in the confidential-key storing part and output encrypted device information;
    a transmitting part configured to transmit the encrypted device information to another functional unit within the image reading device;
    a receiving part configured to receive encrypted device information from other functional units within the image reading device;
    a decrypting part configured to decrypt the received encrypted device information using the confidential key stored in the confidential-key storing part and output decrypted device information;
    an authentication part configured to authenticate whether the decrypted device information corresponds to the device information of other functional units stored in the second device-information storing part, wherein
the functional units are configured to mutually perform authentications of the decrypted device information with one another to determine whether the functional units are usable,
the image reading device is configured to switch to an operable state when it is determined that all the functional units are usable, and
the image reading device is configured to generate an alarm or an error signal when it is determined that at least one of the functional units is unusable.

2. The image reading device according to claim 1, wherein the device information includes information relating to at least one of
    unit information that includes a unit identification number of a corresponding functional unit;
    expendable-part information relating to an expendable part of the corresponding functional unit;
    program-version information relating to a version of a program to be executed by the corresponding functional unit;
    measurement-value information relating to an ambient environment of the corresponding functional unit including temperature, humidity, and altitude;
    setting information in an operation of the corresponding functional unit; and
    operation-result information relating to a result of the operation.

3. The image reading device according to claim 1, wherein the transmitting part is configured to convert the encrypted device information into a hash value, then transmit the hash value to other functional units within the image reading device.

* * * * *